(12) United States Patent
Chen

(10) Patent No.: US 6,707,582 B2
(45) Date of Patent: Mar. 16, 2004

(54) SCANNING DEVICE CAPABLE OF CALIBRATING STEP ANGLE ERRORS

(75) Inventor: Michael Chen, Hsin-Chu (TW)

(73) Assignee: Avision Inc., Hsin-Chu Hsien (TW)

( * ) Notice: Subject to any disclaimer, the term of this patent is extended or adjusted under 35 U.S.C. 154(b) by 201 days.

(21) Appl. No.: 09/683,804

(22) Filed: Feb. 19, 2002

(65) Prior Publication Data

US 2003/0076544 A1 Apr. 24, 2003

(30) Foreign Application Priority Data

Oct. 18, 2001 (TW) .................................. 90125841 A

(51) Int. Cl.7 ......................... H04N 1/04; H04N 1/36
(52) U.S. Cl. .................. 358/474; 358/496; 358/497; 358/498; 358/412; 358/413
(58) Field of Search ................. 358/496, 474, 358/497, 498, 412, 413

(56) References Cited

U.S. PATENT DOCUMENTS 6,069,464 A * 5/2000 Wu .............................. 318/610

FOREIGN PATENT DOCUMENTS

JP 57190456 * 5/1981 ............ H04N/1/04

* cited by examiner

Primary Examiner—Edward Coles
Assistant Examiner—Houshang Safaipour
(74) Attorney, Agent, or Firm—Winston Hsu

(57) ABSTRACT

A scanner includes a housing, a transparent platform, a scanning module, a motor and a calibration paper. The transparent platform is installed on the housing for a document to be placed on. The scanning module is moveably installed inside the housing for scanning the document. The motor is installed inside the housing for driving the scanning module. The calibration paper is installed at a front end of the housing and has a graph for calibrating step angle errors of the motor.

9 Claims, 6 Drawing Sheets

SCANNING DEVICE CAPABLE OF CALIBRATING STEP ANGLE ERRORS

BACKGROUND OF INVENTION

1. Field of the Invention

The present invention relates to a scanning device, and more specifically, to a scanning device capable of calibrating the step angle errors of a motor.

2. Description of the Prior Art

Desktop scanners are very popular computer peripheral devices. They are used to scan documents to generate corresponding image data. In addition, scanners can provide extra functionality. For example, a scanner may be used to send image data as fax image data to other facsimile devices through a phone line, to other people in an e-mail format through a network, or to a printer for copying. As the scanning technology progresses, the quality requirements for scanners turns more and more rigid as well. It is therefore an important issue to prevent scanning errors caused by errors of either the hardware or the software of the scanner.

Please refer to FIG. 1 of a schematic diagram of a scanner 10 according to the prior art. As shown in FIG. 1, the scanner 10 includes a housing 12, a transparent platform 14 installed on the housing 12 for a document 20 to be placed on, and a scanning module 16 moveably installed inside the housing 12 for scanning the document 20 and generating an corresponding image of the document 20. The scanner also has a step motor 18, installed inside the housing 12 and physically and electrically connected to the scanning module 16, for driving the scanning module 16 step-by-step to scan the document 20.

Theoretically, ideal step lengths of the scanning module 16 generated by one-step-forwards motions of the step motor 18 are all the same. Each ideal step length equals to a quotient of a distance traveled by the scanning module 16 driven by one complete rotation of the step motor 18, divided by the number of the steps traveled by the step motor 18 during the complete rotation. Unfortunately, a step angle error of the step motor 18 caused by manufacturing errors frequently leads to different step lengths of the scanning module 16 generated by one-step-forwards motions of the step motor 18.

Please refer to FIG. 2a and FIG. 2b, which respectively represent a document to be scanned and an image generated after the scanner 10 scans the document according to the prior art. As shown in FIG. 2a, the document to be scanned includes three parallel lines 21, a distance 22 between the first and second lines 21 being equal to a distance 24 between the second and the third lines 21. Due to the step angle error of the step motor 18, the image generated after scanning the document is slightly different from an actual image of the document. As shown in FIG. 2b, a distance 26 between the first and second lines 21 on the generated image, and a distance 28 between the second and the third lines 21 on the generated image are not equal to the distance 22 between the first and second lines 21 on the actual image of the document and the distance 24 between the second and the third lines 21 on the actual image of the document. In other words, the step angle error of the step motor 18 leads to a scanning error of the scanner 10. In addition to the step angle errors in the step motor 18, slight angle errors of spokes also frequently occur in servomotors due to manufacturing errors and lead to errors of images generated by scanning. The higher the resolution of the scanner is, the more conspicuous and intolerable the error of the generated image caused by the angle error is.

SUMMARY OF INVENTION

It is therefore a primary objective of the claimed invention to provide a scanning device for calibrating step angle errors of a motor.

According to the claimed invention, a scanner comprises a housing, a transparent platform, a scanning module, a motor, and a calibration paper. The transparent platform is installed on the housing for a document to be placed on. The scanning module is moveably installed inside the housing for scanning the document. The motor is installed inside the housing for driving the scanning module. The calibration paper is installed at a front end of the housing and has a graph for calibrating step angle errors of the motor.

It is an advantage of the claimed invention that the scanner includes the calibration paper. The scanner scans the graph on the calibration paper before scanning the document to obtain the ideal step length of the scanning module generated by the step motor. In addition, the comparison table disclosed in the claimed invention stores the ideal step length and the actual step length of both the scanning module and the step motor. Thus the scanning module calibrates the image generated by scanning the document according to the distance between the graph and the front end of the transparent platform 54, the actual step lengths and the ideal step lengths of the scanning module 56. Consequently, the accuracy of the scanning is significantly improved.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
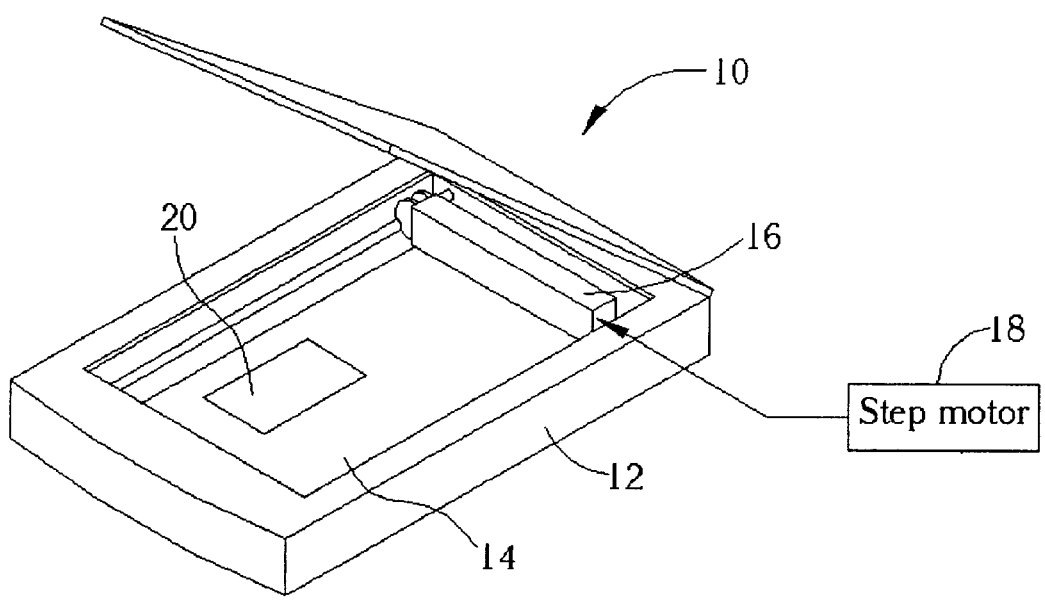
FIG. 1 is a schematic diagram of a scanner according to the prior art.
Figure 2A:
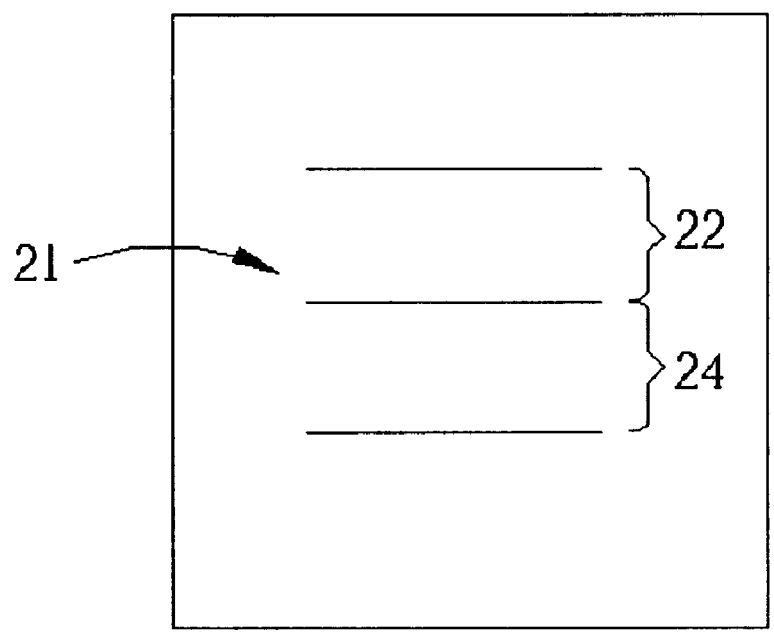
FIG. 2a represents a document to be scanned.
Figure 2B:
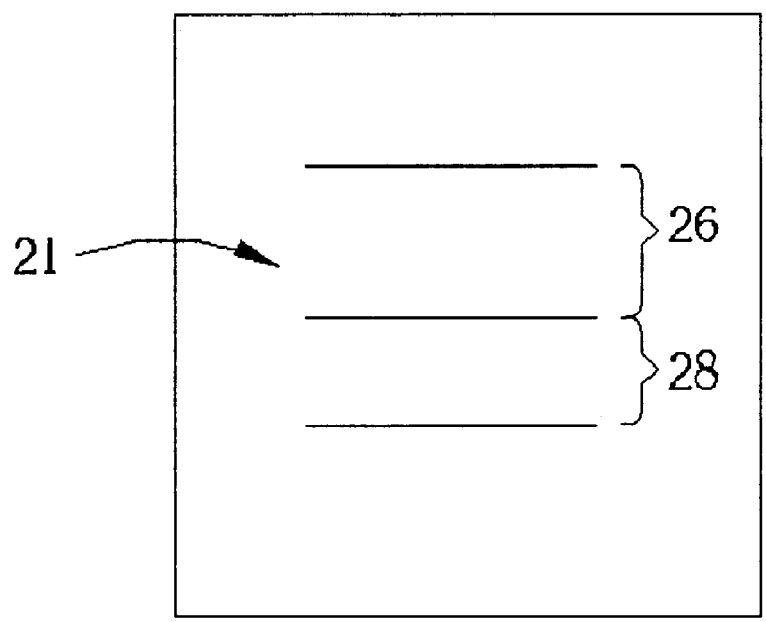
FIG. 2b represents an image generated after the document is scanned by the scanner according to the prior art.
Figure 3:
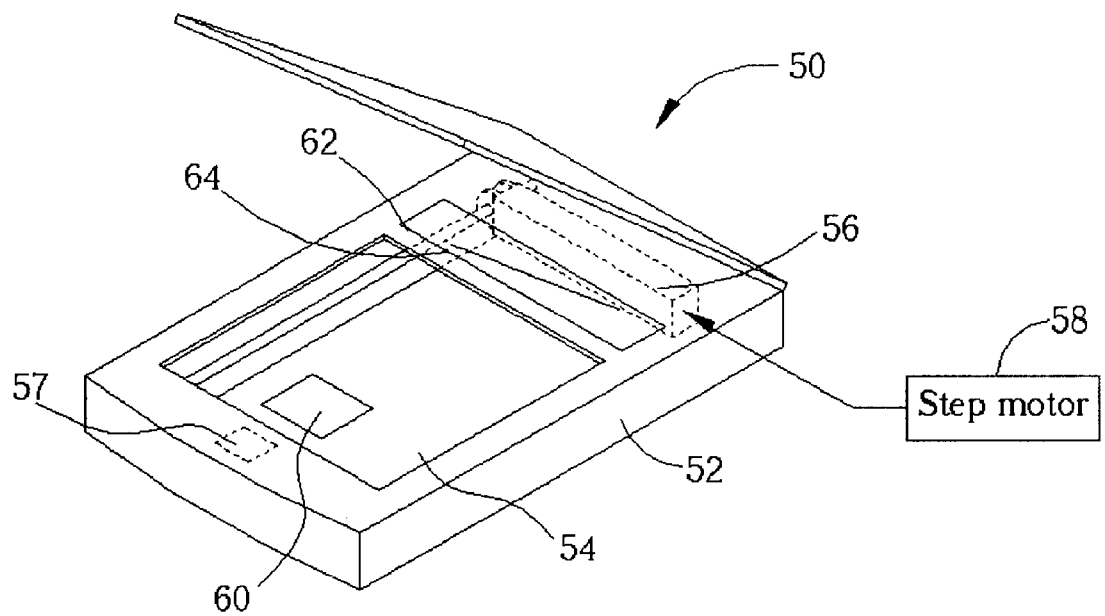
FIG. 3 is the schematic diagram of a scanner according to the present invention.

Please refer to FIG. 3 of a schematic diagram of a scanner 50 according to the present invention. As shown in FIG. 3, the scanner 50 comprises a housing 52, a transparent platform 54 installed on the housing 52 for a document 60 to be placed on, and a scanning module 56 moveably installed inside the housing 52 for scanning the document 60 and generating an corresponding image of the document 60. The scanner 50 also includes a step motor 58 installed inside the housing 52 for driving the scanning module 56, a control circuit 57 installed inside the housing 52 for controlling the operation of the scanner 50, and a calibration paper 62, comprising a straight line 64, installed at a front end of the housing 52. When scanning, the scanning module 56 scans the straight line 64 before scanning the document 60.

Figure 4:
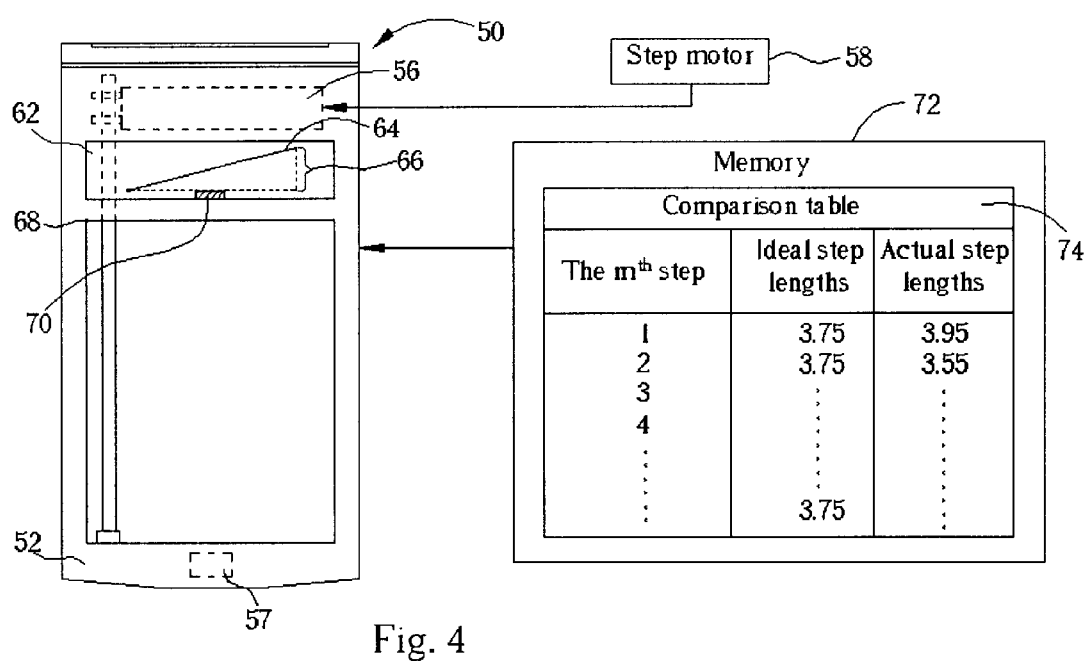
FIG. 4 represents a top view of the scanner according to the present invention.
Figure 5:
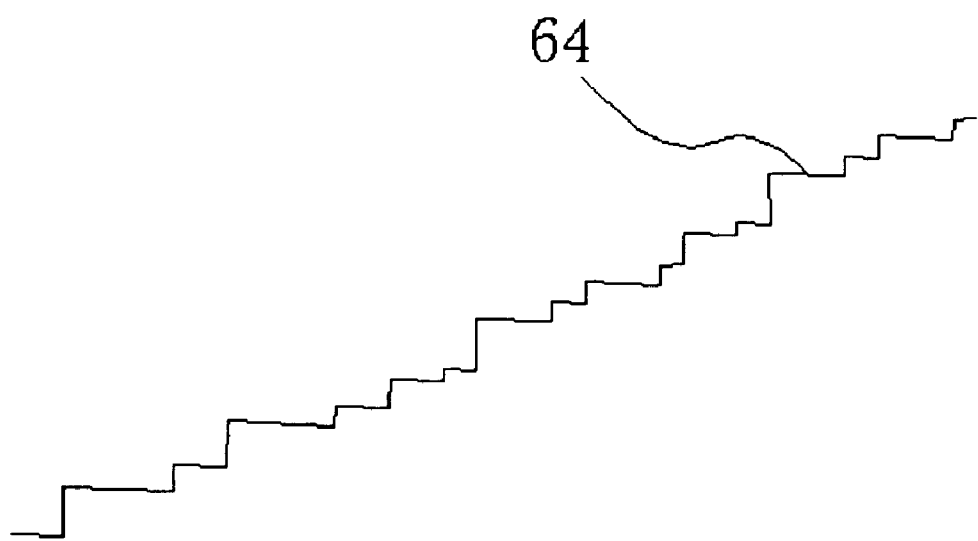
FIG. 5 represents an image generated after scanning the straight line 64.

Please refer to FIG. 4 and FIG. 5, which respectively represent a top view of the scanner 50 according to the present invention, and an image generated after scanning the straight line 64. As shown in FIG. 4, the straight line 64 on the calibration paper 62 forms an acute angle ranging from 4 to 7 degrees with a horizontal side of the calibration paper 62. A length of the straight line 64 along a vertical side of the calibration paper 62 equals to at least a distance traveled by the scanning module 56 driven by one complete rotation of the step motor 58. In the preferred embodiment of the present invention, the acute angle is between 5 and 6 degrees. As shown in FIG. 5, since the scanning module 56 scans the straight line 64 on the calibration paper 62 before scanning the document 60, a serrated-shaped image of the straight line 64 is generated after the scanning due to the step angle error of the step motor 58. The scanner 50 further comprises a memory 72. The memory 72 comprises a comparison table 74 for storing actual step lengths of the scanning module 56 generated by actual one-step-forwards motions of the step motor 58. The comparison table 74 also stores ideal step lengths of the scanning module 56 generated by ideal one-step-forwards motions of the step motor 58 according to the serrated-shaped image generated by scanning the straight line 64 and the true image of the straight line 64. A reference block 70 is positioned at the bottom central portion of the calibration paper 62 and a reference point 68 is positioned at a left front end of the transparent platform 54. The memory 72 stores a vertical distance y between the reference block 70 and the reference point 68, where the distance y equals to a distance the scanning module 56 needs to travel from the reference block 70 before entering the scanning region of the scanner 50.

After the scanning module 56 scans the straight line 64 and the comparison table 74 stores actual step lengths of the scanning module 56 generated by actual one-step-forwards motions of the step motor 58, the step motor 58 continues to drive the scanning module 56 and the memory 72 stores the number of steps of the step motor 58. As the scanning module 56 passes through the reference block 70, the memory continues to store the number of steps of the step motor 58 as well as to store the actual distance the scanning module 56 travels after passing through the reference block 70. By using data stored in the comparison table 74 of the memory 72, the scanner 50 calibrates the image generated by the scanning module during every step of the scanning module 56 driven by the step motor 58. The actual distance the scanning module 56 travels after passing through the reference block 70 is either equal to or greater than y after the scanning module enters the scanning region of the scanner 50. The accuracy of the image generated is thus assured.

If the scanning module 56 passes through the reference block 70 as the step motor 58 takes the $m^{th}$ step, the memory 72 reads the data of an actual step length $x_1$ of the scanning module 56 generated by the $m+1^{th}$ step of the step motor 58. This reading is done according to the comparison table 74 as the step motor 58 takes the $m+1^{th}$ step. In other words, $x_1$ is the actual distance the scanning module 56 travels after passing through the reference block 70 as the step motor 58 takes the $m+1^{th}$ step. Then, as the step motor 58 takes the $m+2^{th}$ step, the memory 72 reads the data of an actual step length $x_2$ of the scanning module 56 generated by the $m+2^{th}$ step of the step motor 58, according to the comparison table 74 in the same manner. The actual distance the scanning module 56 travels after passing through the reference block 70 is therefore $x_1+x_2$ as the step motor 58 takes the $m+2^{th}$ step. Then, as the step motor 58 takes the $m+3^{th}$ step, the memory 72 reads the data of an actual step length $x_3$ of the scanning module 56 generated by the $m+3^{th}$ step of the step motor 58, according to the comparison table 74 in the same manner. The actual distance the scanning module 56 travels after passing through the reference block 70 is therefore $x_1+x_2+x_3$ as the step motor 58 takes the $m+3^{th}$ step. The actual distance the scanning module 56 travels after passing through the reference block 70 is thus obtained. Consequently, the memory adds a corresponding actual step length to the actual distance during every step of the step motor 58 until the actual distance is either equal to or larger than y. Then, as the scanning module 56 enters the scanning region, the scanner 50 utilizes the memory 72 to adjust the generated image. This adjustment is done according to the data stored in the comparison table 74 during every further step of the scanning module generated by the step motor 58.

In addition, the memory 72 can store an average actual step length the scanning module 56 travels, generated by every two or more steps of the step motor 58, into the comparison table 74 as the scanning module 56 scans the straight line 64 on the calibration paper 62. This averaging can help improve the adjustment towards the scanning module 56.

The adjustment method disclosed in the preceding paragraphs can be applied not only to the straight line 64 scanned by the scanner 50 with the step motor 58, but also to a document with various figures scanned by either a servomotor or a scanner to adjust step angle errors of a scanner. In addition, step angle errors can be adjusted as well by circuit control so as to make the actual step length equal to the ideal step length.

In comparison to the scanner 10 according to the prior art, the scanner 50 revealed in the present invention comprises the calibration paper 62. The scanner 50 scans the straight line 64 on the calibration paper 62 before scanning the document 60 to obtain the ideal step length of the scanning module 56 generated by the step motor 58. In addition, the comparison table 74 disclosed in the present invention stores the ideal step length and the actual step length of either of the scanning module 56 and the step motor 58. Thus the scanning module 56 calibrates the image generated by scanning the document 60 according to the distance between the graph and the front end of the transparent platform 54, the actual step lengths and the ideal step lengths of the scanning module 56. Consequently, the accuracy of the scanning is significantly improved.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A scanner comprising:

a housing;

a transparent platform installed on the housing for a document to be placed on;

a scanning module moveably installed inside the housing for scanning the document;

a motor installed inside the housing for driving the scanning module; and a calibration paper installed at a front end of the housing, the calibration paper having a graph for calibrating step angle errors of the motor;

wherein the scanning module scans the graph before scanning the document, and calibrates an image generated by scanning the document according to differences between an image generated by scanning the graph and a true image of the graph.

2. The scanner of claim 1 wherein the graph is a straight line forming an acute angle with a horizontal side of the calibration paper.

3. The scanner of claim 2 wherein the acute angle is between 4 and 7 degrees.

4. The scanner of claim 1 further comprising a memory for storing a distance between the graph and a front end of the transparent platform, the memory comprising a comparison table for storing actual step lengths of the scanning module generated by actual one-step-forwards motions of the motor and an ideal step lengths of the scanning module generated by ideal one-step-forwards motions of the motor according to the image generated by scanning the graph and the true image of the graph, the scanning module calibrating the image generated by scanning the document according to the distance between the graph and the front end of the transparent platform, the actual step lengths and the ideal step lengths of the scanning module.

5. The scanner of claim 4 wherein the distance between the graph and the front end of the transparent platform is a distance measured from an end of the graph closest to the transparent platform to the front end of the transparent platform.

6. The scanner of claim 4 wherein each ideal step length equals to a quotient of a distance traveled by the scanning module driven by one complete rotation of the motor, and the number of steps traveled by the motor during the complete rotation.

7. The scanner of claim 1 wherein a length of the graph along a vertical direction equals to at least a distance traveled by the scanning module driven by one complete rotation of the motor.

8. The scanner of claim 1 wherein the motor is a step motor.

9. The scanner of claim 1 wherein the motor is a servomotor.

* * * * *